US010796336B1

(12) United States Patent
Sanio et al.

(10) Patent No.: US 10,796,336 B1
(45) Date of Patent: *Oct. 6, 2020

(54) CONTENT SELECTION BASED ON CONNECTION INFORMATION

(71) Applicant: Google LLC, Mountain View, CA (US)

(72) Inventors: Jason Robert Richard Sanio, Sunnyvale, CA (US); Courtney Hampson, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 226 days.

This patent is subject to a terminal disclaimer.

(21) Appl. No.: 15/958,104

(22) Filed: Apr. 20, 2018

Related U.S. Application Data

(63) Continuation of application No. 14/136,010, filed on Dec. 20, 2013, now Pat. No. 9,978,079.

(51) Int. Cl.
  *G06Q 30/00* (2012.01)
  *G06Q 30/02* (2012.01)
(52) U.S. Cl.
  CPC ..... *G06Q 30/0251* (2013.01); *G06Q 30/0252* (2013.01); *G06Q 30/0255* (2013.01); *G06Q 30/0269* (2013.01)
(58) Field of Classification Search
  None
  See application file for complete search history.

(56) References Cited

U.S. PATENT DOCUMENTS

| | | | | |
|---|---|---|---|---|
| 2001/0010059 | A1* | 7/2001 | Burman | G06F 11/3419 709/224 |
| 2009/0055254 | A1* | 2/2009 | Madhavan | G06Q 30/02 705/14.41 |
| 2009/0089357 | A1* | 4/2009 | Murray | G06Q 20/02 709/201 |

(Continued)

OTHER PUBLICATIONS

Akamai, [online]. "Content Targeting," 2003, [retrieved on Dec. 20, 2013]. Retrieved from the Internet: <URL: http://www.akamai.com/dl/feature_sheets/fs_edgesuite_contenttargeting.pdf>, 2 pages.
'Google' [online]. "DoubleClick for Publishers," 2013, [retrieved on Dec. 20, 2013, Retrieved from the Internet: <URL: https://support.google.com/dfp_premium/answer/1391351>, 2 pages.

(Continued)

*Primary Examiner* — Kambiz Abdi
*Assistant Examiner* — Christopher Stroud
(74) *Attorney, Agent, or Firm* — Fish & Richardson P.C.

(57) ABSTRACT

Methods, systems, and apparatus include computer programs encoded on a computer-readable storage medium for providing content. A method includes: receiving a first request for an advertisement to be presented in a slot on a web resource that is to be displayed by an access device; identifying an advertisement to serve; determining an amount of time required to deliver the advertisement to the access device including determining a connection speed; storing connection information including at least the connection speed; subsequent to the storing, receiving a second request for a second advertisement from the access device; using the stored connection information to determine one or more of an advertisement eligibility, an advertisement type, or an advertisement size, including selecting a second adver- (Continued)

tisement responsive to the second request that meets at least one of the determined eligibility, size or type; and providing the second advertisement responsive to the second request.

20 Claims, 8 Drawing Sheets

(56) References Cited

U.S. PATENT DOCUMENTS

| | | |
|---|---|---|
| 2013/0051226 A1 | 2/2013 | Elefant et al. |
| 2013/0159494 A1 | 6/2013 | Danda et al. |
| 2014/0082192 A1* | 3/2014 | Wei .................... H04L 65/4084 709/224 |

OTHER PUBLICATIONS

'NBC' [online]. "Frequently Asked Questions," [retrieved on Dec. 20, 2013]. Retrieved from the Internet: URL:http://www.nbc.com/frequently-asked-questions/video, 2 pages.
Taylor, "Chapter 24, CGI Scripting with the UNIX Shell," Web Programming Unleashed, retrieved on Dec. 20, 2013, <http://www.webbasedprogramming.com/Web-Programming-Unleashed/ch24.html>, 19 pages.
'Google' [online]. "Targeting criteria," [retrieved on Feb. 18, 2014]. Retrieved from the internet: URL<https://support.google.com/dfp_premium/answer/177383?hl=en>, 5 pages.
'Web Based Programming Tutorials' [online]. "Chapter 24: CGI Scripting with the UNIX Shell," [retrieved on Feb. 18, 2014]. Retrieved from the internet: URL<http://www.webbasedprogramming.com/Web-Programming-Unleashed/ch24.htm>, 18 pages.

* cited by examiner

CONTENT SELECTION BASED ON CONNECTION INFORMATION

CROSS-REFERENCE TO RELATED APPLICATIONS

This application is a continuation of and claims priority to U.S. application Ser. No. 14/136,010, filed on Dec. 20, 2013, the entire contents of which are hereby incorporated by reference.

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Slots can be allocated to content sponsors through a reservation system or an auction. For example, content sponsors can provide bids specifying amounts that the sponsors are respectively willing to pay for presentation of their content. In turn, a reservation can be made or an auction can be performed, and the slots can be allocated to sponsors according, among other things, to their bids and/or the relevance of the sponsored content to content presented on a page hosting the slot or a request that is received for the sponsored content.

SUMMARY

In general, one innovative aspect of the subject matter described in this specification can be implemented in methods that include a method for providing content. The method includes: identifying designated advertisement types for display on a first web resource including acceptable types depending on a connection speed associated with a given request for presenting the first web resource; receiving a first request for an advertisement to be presented in a slot on the first web resource that is to be displayed by an access device; identifying an advertisement to serve responsive to the first request; determining an amount of time required to deliver the advertisement to the access device including determining a connection speed for delivering the advertisement to a location associated with the access device from a serving system; storing connection information including at least the connection speed in association with the location and the first web resource; subsequent to the storing, receiving a second request for a second advertisement from the access device, wherein the second request is received from the access device when it is substantially located at the location or the second request is for the first web resource; using the stored connection information to determine one or more of an advertisement eligibility, an advertisement type, or an advertisement size, including selecting a second advertisement responsive to the second request that meets at least one of the determined eligibility, size or type; and providing the second advertisement responsive to the second request.

In general, another aspect of the subject matter described in this specification can be implemented in computer program products. A computer program product is tangibly embodied in a computer-readable storage device and comprises instructions. The instructions, when executed by a processor, cause the processor to: identify designated advertisement types for display on a first web resource including acceptable types depending on a connection speed associated with a given request for presenting the first web resource; receive a first request for an advertisement to be presented in a slot on the first web resource that is to be displayed by an access device; identify an advertisement to serve responsive to the first request; determine an amount of time required to deliver the advertisement to the access device including determining a connection speed for delivering the advertisement to a location associated with the access device from a serving system; store connection information including at least the connection speed in association with the location and the first web resource; subsequent to the storing, receive a second request for a second advertisement from the access device, wherein the second request is received from the access device when it is substantially located at the location or the second request is for the first web resource; use the stored connection information to determine one or more of an advertisement eligibility, an advertisement type, or an advertisement size, including selecting a second advertisement responsive to the second request that meets at least one of the determined eligibility, size or type; and provide the second advertisement responsive to the second request.

In general, another aspect of the subject matter described in this specification can be implemented in systems. A system includes one or more processors and one or more memory elements including instructions. The instructions, when executed, cause the one or more processors to: identify designated advertisement types for display on a first web resource including acceptable types depending on a connection speed associated with a given request for presenting the first web resource; receive a first request for an advertisement to be presented in a slot on the first web resource that is to be displayed by an access device; identify an advertisement to serve responsive to the first request; determine an amount of time required to deliver the advertisement to the access device including determining a connection speed for delivering the advertisement to a location associated with the access device from a serving system; store connection information including at least the connection speed in association with the location and the first web resource; subsequent to the storing, receive a second request for a second advertisement from the access device, wherein the second request is received from the access device when it is substantially located at the location or the second request is for the first web resource; use the stored connection information to determine one or more of an advertisement eligibility, an advertisement type, or an advertisement size, including selecting a second advertisement responsive to the second request that meets at least one of the determined eligibility, size or type; and provide the second advertisement responsive to the second request.

These and other implementations can each optionally include one or more of the following features. Determining the amount of time can include determining the time elapsed between an associated advertisement call for the first request and the identified advertisement loading on the access device, wherein the time elapsed is based on a file size of the identified advertisement and a connection speed associated with a connection between the access device and the serving device. One or more predetermined thresholds for determining which types of advertisements are eligible to compete for which connection speeds can be identified. A connection speed associated with the second request can be determined based at least in part on the stored connection information. Using the connection information can include determining whether to show text advertisements, image advertisements or rich media advertisements and providing the second advertisement can include providing an appropriate advertisement in accordance with the determining. A connection speed can be periodically checked, wherein the connection speed is associated with a device's access to the web resource, serving system, or during a session when the access device is at the location. The connection information can be updated based on the periodic checking. A third request for an advertisement can be received from the access device. The third request can be for a different web resource. The different web resource can be associated with a different connection speed than a connection speed associated with the first web resource as reflected by the connection information. The different connection speed can be used to determine one or more of advertisement eligibility, advertisement type, or advertisement size, including the selection of a third advertisement responsive to the third request that meets at least one of the determined eligibility, size or type and is of a different size or type than the second advertisement. The third advertisement can be provided responsive to the third received request. A change to the connection speed can be predicted based on one or more known connection issues and the connection information can be updated based on the predicted connection speed. A determination can be made as to whether the second advertisement is going to be visible on a display of the access device at a time of the initial load or whether the second advertisement will be below or above a fold line associated with the display. Selecting the second advertisement can be based at least in part on whether the second advertisement is visible at the time of the initial load. Only a portion of the second advertisement can be loaded initially when the connection speed is below a first threshold. The portion can be a text only portion. A user interface accessible by an entity associated with a publisher of the first web resource can be provided. A control can be provided in the interface and the control can be used for designating advertisement types for display on the first web resource. The control can include an option to limit the types depending on the connection speed. A selection of advertisement types and option information that embodies a selection of the option can be received. Determining the second advertisement can be based at least in part on the selection of advertisement types and the option information received from the entity. The connection information can be used to select advertisements delivered to the access device for one session without further update of the speed information during the one session. Determining the connection speed can further include determining a load speed of content from the first web resource as a proxy for the connection speed for loading the advertisement from the serving system.

Particular implementations may realize none, one or more of the following advantages. A type of content item to present on an access device can be selected based on the connection speed of a connection that is associated with delivery of the content item to the access device. A content sponsor can provide multiple versions of a content item to be presented on an access device, each version customized for a particular level of connection speed. A publisher can specify different types of content to present in content slots of a resource, where each content type corresponds to a different level of connection speed.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A content item (e.g., advertisement) that is responsive to a request for a content item to be presented in a slot on a web resource can be selected based on stored connection information associated, for example, with one or more of the access device associated with the request, the location of the access device, the location of a server associated with the content item, or the location of a server associated with the web resource. In some implementations, selection can be based on other connection information, such as network outage information. For example, based on the stored connection information, one or more eligible content item parameters can be determined, such as content item size (e.g., storage size) or content item type (e.g., text, image, rich media (e.g., video)). The content item parameters can be used to select the content item to provide responsive to the request.

For situations in which the systems discussed here collect information about users, or may make use of information about users, the users may be provided with an opportunity to control whether programs or features collect user information (e.g., information about a user's social network, social actions or activities, profession, demographics, a user's preferences, or a user's current location), or to control whether and/or how to receive content from the content server that may be more relevant to the user. In addition, certain data may be treated in one or more ways before it is stored or used, so that certain information about the user is removed. For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information about the user is collected and used by a content server.

Figure 1:
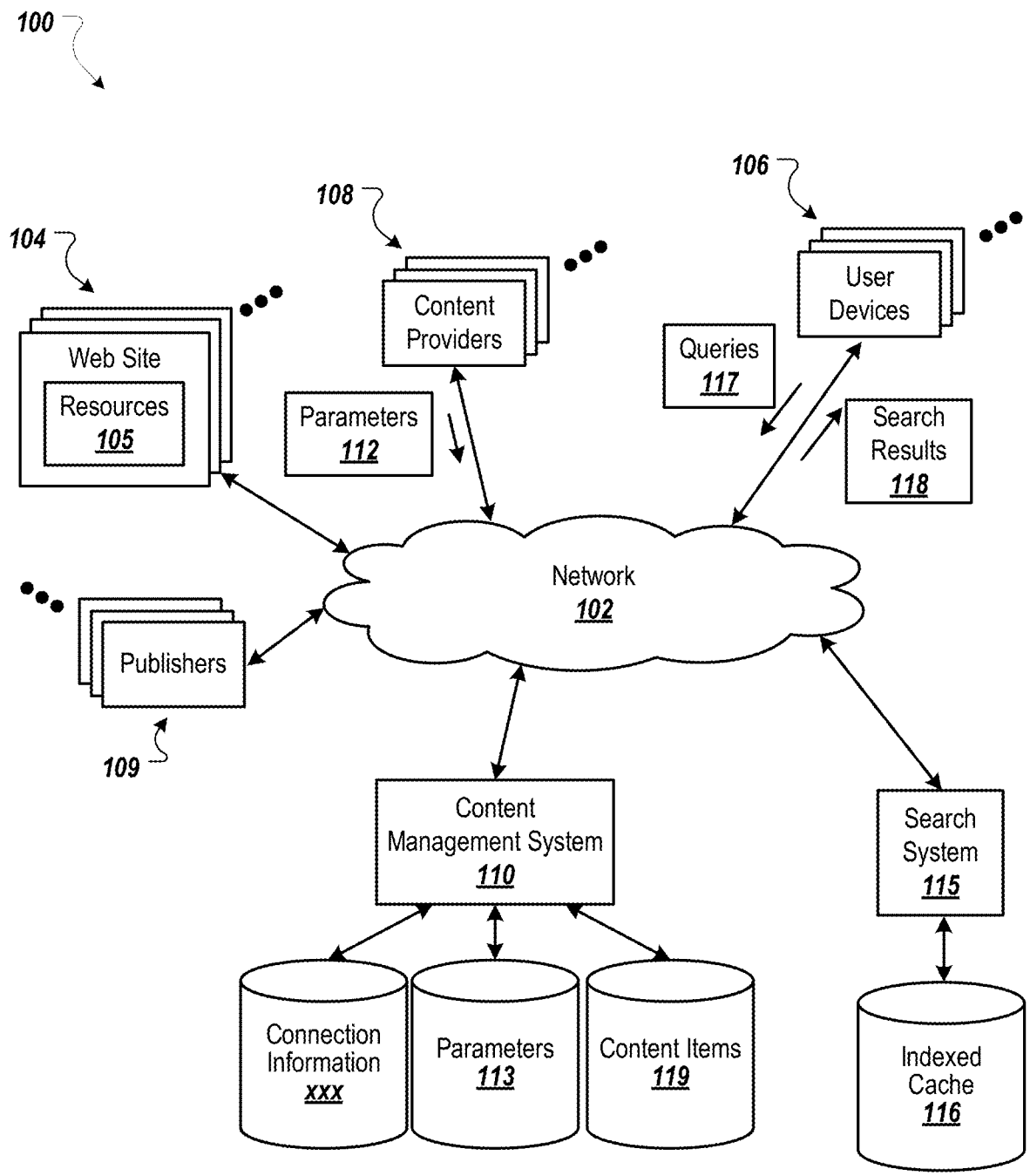
FIG. 1 is a block diagram of an example environment for presenting content.

FIG. 1 is a block diagram of an example environment 100 for providing content to a user. The example environment 100 includes a network 102, such as a local area network (LAN), a wide area network (WAN), the Internet, or a combination thereof. The network 102 connects websites 104, user devices (e.g., access devices) 106, content providers 108, publishers 109, and a content management system 110. The example environment 100 may include many thousands of websites 104, user devices 106, content providers 108, and publishers 109. The content management system 110 may be used for selecting and providing content in response to requests for content. The content providers 108 can be, for example, advertisers. Other types of content providers are possible.

A content provider 108 or content sponsor can create a content campaign associated with one or more content items using tools provided by the content management system 110. For example, the content management system 110 can provide one or more account management user interfaces for creating and managing content campaigns. The account management user interfaces can be made available to the content provider 108, for example, either through an online interface provided by the content management system 110 or as an account management software application installed and executed locally at a content provider's client device.

A content provider 108 can, using the account management user interfaces, provide campaign parameters 112 which define a content campaign. The content campaign can be created and activated for the content provider 108 according to the parameters 112 specified by the content provider 108. The campaign parameters 112 can be stored in a campaign database 113. Campaign parameters 112 can include, for example, a campaign name, a preferred content network for placing content, a budget for the campaign, start and end dates for the campaign, a schedule for content placements, content (e.g., creatives), bids, and selection criteria. Selection criteria can include, for example, a language, one or more geographical locations or websites, and/or one or more selection terms. The selection terms can include, for example, one or more keywords. The selection terms can be used in evaluating when to serve content items in response to received requests for content. As discussed in more detail below, the campaign parameters can also include sponsor selections related to connection speed.

A content provider 108 can provide multiple versions of a content item, with each version customized for a particular connection speed associated with a connection for a user device 106 upon which the content item is to be presented. For example, the content provider 108 can provide a text-only version of a content item that is to be presented on user devices which have an associated connection speed (e.g., an estimated speed of the connection between the specific serving system associated with the content item and the user device) that is below a threshold. The content provider 108 can provide an image content item that is to be presented on user devices which have an associated connection speed that is above the threshold.

A website 104 includes one or more resources 105 associated with a domain name and hosted by one or more servers. An example website 104 is a collection of web pages formatted in hypertext markup language (HTML) that can contain text, images, multimedia content, and programming elements, such as scripts. Each website 104 can be maintained by a publisher 109, which is an entity that controls, manages and/or owns the website 104.

A resource 105 can be any data that can be provided over the network 102. A resource 105 can be identified by a resource address that is associated with the resource 105. Resources 105 include HTML pages, word processing documents, portable document format (PDF) documents, images, video, and news feed sources, to name only a few. The resources 105 can include content, such as words, phrases, videos, images and sounds, that may include embedded information (such as meta-information hyperlinks) and/or embedded instructions (such as scripts).

A user device 106 is an electronic device that is under control of a user and is capable of requesting and receiving resources 105 over the network 102. Example user devices 106 include personal computers, tablet computers, mobile communication devices (e.g., smartphones), televisions, set top boxes, personal digital assistants and other devices that can send and receive data over the network 102. A user device 106 typically includes one or more user applications, such as a web browser, to facilitate the sending and receiving of data over the network 102. The web browser can interact with various types of web applications, such as a game, a map application, or an e-mail application, to name a few examples.

A user device 106 can request resources 105 from a website 104. In turn, data representing the resource 105 can be provided to the user device 106 for presentation by the user device 106. User devices 106 can also submit search queries 117 to the search system 115 over the network 102. In response to a search query 117, the search system 115 can, for example, access the indexed cache 116 to identify resources 105 that are relevant to the search query 117. The search system 115 identifies the resources 105 in the form of search results 118 and returns the search results 118 to the user devices 106 in search results pages. A search result 118 is data generated by the search system 115 that identifies a resource 105 that is responsive to a particular search query 117, and includes a link to the resource 105. An example search result 118 can include a web page title, a snippet of text or a portion of an image extracted from the web page, and the URL (Unified Resource Location) of the web page.

The data representing the resource 105 or the search results 118 can also include data specifying a portion of the resource 105 or search results 118 or a portion of a user display (e.g., a presentation location of a pop-up window or in a slot of a web page) in which other content (e.g., advertisements) can be presented. These specified portions of the resource or user display are referred to as slots or impressions. An example slot is an advertisement slot.

In some implementations, a publisher 109 can configure a slot to specify a type of content to display in the slot. For example, the publisher 109 can specify that image content, text content, or rich media content is to be displayed in the slot. In some implementations, the publisher 109 (or alternatively another entity) can specify that a type of content to display in the slot is to be based on a connection speed of a user device 105. For example, the publisher 109 can specify that if the connection speed is below a threshold, a text content item is to be displayed in the slot and that if the connection speed is at or above the threshold, an image content item is to be displayed in the slot.

When a resource 105 or search results 118 are requested by a user device 106, the content management system 110 may receive a request for content to be provided with the resource 105 or search results 118. The request for content can include characteristics of one or more slots or impressions that are defined for the requested resource 105 or search results 118. For example, a reference (e.g., URL) to the resource 105 or search results 118 for which the slot is defined, a size of the slot, and/or media types that are available for presentation in the slot can be provided to the content management system 110. Similarly, keywords associated with a requested resource 105 or a search query 117 for which search results 118 are requested can also be provided to the content management system 110 to facilitate identification of content that is relevant to the resource 105 or search query 117. An identifier (e.g., cookie) associated with the user device 106 and location information associated with the user device 106 can be received with the request for content.

Based, for example, on data included in the request for content, the content management system 110 can select (e.g., from a content items data store 119) content items that are eligible to be provided in response to the request. The content management system 110 can, for example, select a content item having characteristics matching the characteristics of a given slot. As another example, content items having selection criteria (e.g., keywords) that match resource keywords in the search query 117 or keywords included in the search results 118 may be selected as eligible content items by the content management system 110. As yet another example, the content management system 110 can identify a content item in the content items datastore 119 that is associated with a keyword that matches a keyword included in a user profile associated with the requesting user device 106.

In some implementations, the content management system 110 can select content items based at least in part on results of an auction. For example, content providers 108 can provide bids specifying amounts that the content providers 108 are respectively willing to pay for presentation of their content items. In turn, an auction can be performed and the slots can be allocated to content providers 108 according, among other things, to their bids and/or the relevance of a content item to content presented on a page hosting the slot or a request that is received for the content item. For example, when a slot is being allocated in an auction, the slot can be allocated to the content provider 108 that provided the highest bid or a highest auction score (e.g., a score that is computed as a function of a bid and/or a quality measure). A quality score can be determined, for example, based on a quality of match between, for example, a keyword associated with a content item and keywords associated with a resource that includes the slot associated with the request. As another example, a quality score can be determined based on a quality of match between a keyword associated with a content item and keywords included in a user device profile associated with the requesting user device.

One or more selected content items can be provided to the user device 106 in association with providing an associated resource 105 or search results 118. The provided content item(s) can be presented on the user device 106, in one or more respective slots.

In association with the providing of a selected content item, an amount of time required to deliver the selected content item to the requesting user device 106 can be determined. The determined amount of time can be used for determining a connection speed associated with a specific connection of the user device 106 and the location of the user device 106. Connection information can be stored in a connection information data store 120. In some implementations, connection information can include an identifier associated with the user device 106, the determined connection speed, location information (e.g., where the device is when making the request), an identifier (e.g., an IP (Internet Protocol) address) associated with a server associated with the content management system 110 (e.g., an advertisement server) that served the selected content item, an identifier (e.g., an IP address) associated with a resource 105 upon which the selected content item was presented, and/or other connection-related information.

Stored connection information for a user device 106 can be used when the content management system 110 responds to subsequent requests for content for the user device 106, such as requests for content that are received from the user device 106 from a location for which connection information is stored for the user device 106. For example, in response to a request for content from the user device 106, the stored connection information can be used to determine one or more eligible content items, a content item type, or a content item size. For example, a text content item type or an image content item type can be determined based on whether the stored connection information indicates a connection speed that is less than or greater than a threshold connection speed, respectively. The content management system 110 can select a content item that meets the determined eligibility, size, or type. For example, the content management system 110 can select a text content item when the stored connection speed is less than the threshold and an image content item when the stored connection speed is greater than the threshold. The selected content item can be provided to the requesting user device 106.

The content management system 110 can periodically check a connection speed associated with a particular user device 106 and with a particular location, serving system, or resource 105. For example, the content management system 110 can check a connection speed multiple times within a user session and/or can check a connection speed across multiple sessions. When the content management system 110 determines that a connection speed has changed, the content management system 110 can update the connection speed information and subsequently adjust selections to a different type of content for subsequent received requests from the same location or server. For example, a connection speed for a particular user device and a particular location may during a first time period be below a threshold, and the content management system 110 can be configured to select text content items in response to requests for content received from the user device 106 at the location during the first time period. The content management system 110 can determine, at a time after the first time period (e.g., during a second time period) that the connection speed for the user device 106 at the location has increased. The content management system 110 can be configured to select image content items in response to requests for content received from the user device 106 at the location during the second time period.

Figure 2:
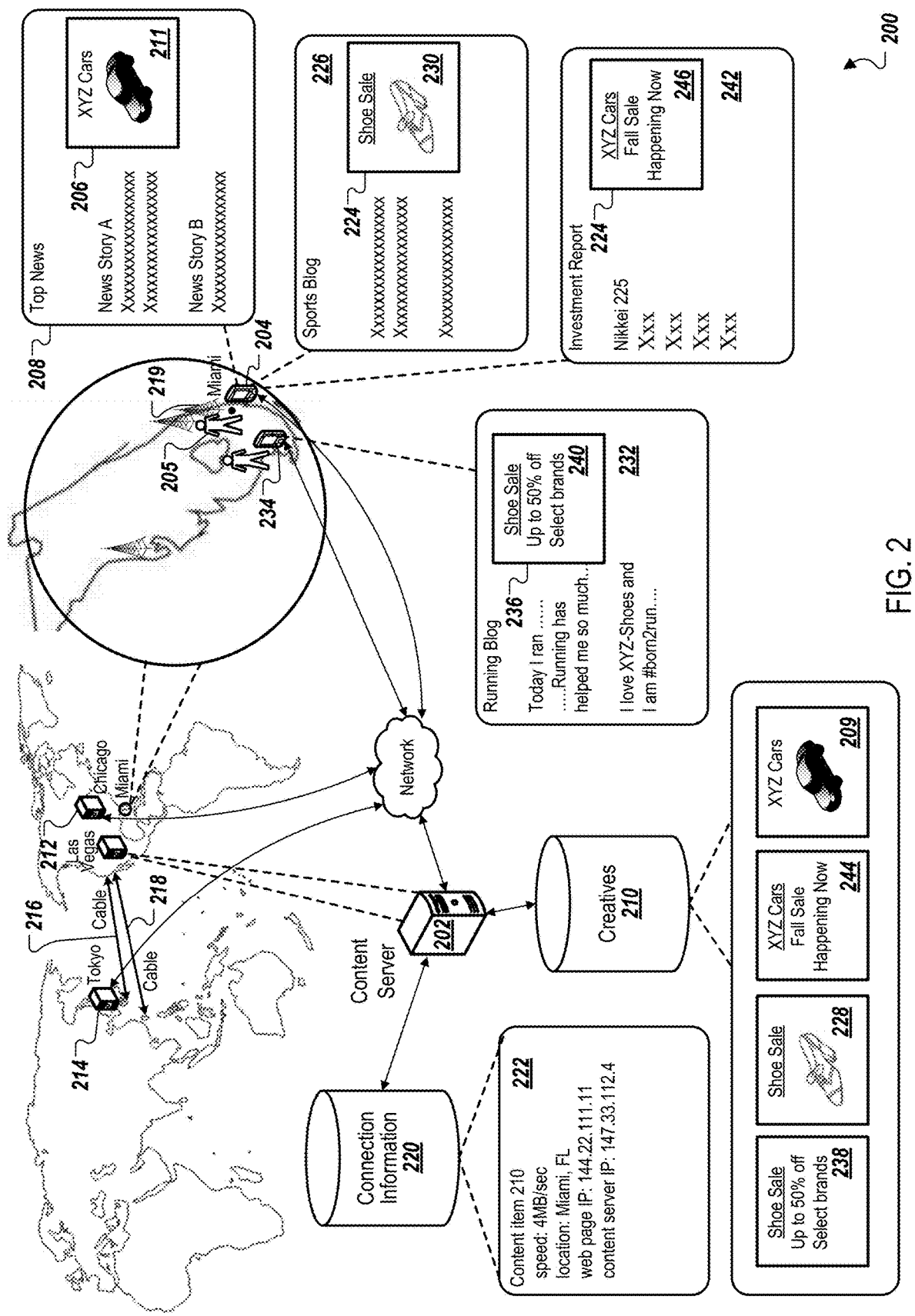
FIG. 2 is a block diagram of an example system for presenting content.

FIG. 2 is a block diagram of an example system 200 for presenting content. A content server 202 receives a request for a content item (e.g., advertisement) from a user device (e.g., access device) 204 of a user 205 for a content slot 206 included in a web page 208. The content server 202 can select an image content item 209 from a content items repository 210 in response to the request and provide the selected content item to the user device 204. The provided content item can be presented in the content slot 206, as illustrated by a content item 211.

An amount of time required to deliver the content item 211 to the user device 204 can be determined, such as by one or more client-side scripts running on the user device 204, processing on the content server 202, or a combination of client and server-side processing. For example, an amount of time elapsed between an associated call for a content item (e.g., an advertisement call) and the content item 211 loading on the user device 204 can be determined. A connection speed for delivering the content item 211 to the user device 204 can be determined based on the elapsed time and a file size of the content item 211. For example, the content item

211 can be 2 MB in size, the elapsed time can be 0.5 seconds, and the determined connection speed can be 4 MB/sec.

Various factors can affect connection speed, such as a communication capability of the user device 204, a bandwidth of the content server 202 or another server (e.g., an advertisement server) associated with the content item 211, or a server associated with the web page 208. Distance between a server and the user device 204 can also affect connection speed. For example, a response to a content request received from the content server 202 in Las Vegas may be received in more time than a response received from a content server 212 located in Chicago and in less time than a response received from a content server 214 located in Tokyo.

As another example, network issues can affect connection speed. Network issues can include, for example, network outages, network congestion, power failures, or server connection issues. Such network issues can be known to the content server 202 and can be used to determine or adjust connection speed information. For example, the content server 214 may be aware that two network links 216 and 218 are deployed for overseas network access to Asia and that one link (e.g., the link 218) is currently out of service. The content server 214 (or the content server 202) can adjust connection speed estimates based on this information. As another example, distance between a nearest cell tower and the user device 204 can be determined and used to adjust or determine the connection speed. For example, a distance of one mile between the user device 204 and a nearest cell tower 219 can be determined and used in determining connection speed for the user device at that location.

The load time of the content item 211 may be dependent on the distance from the content server 202 (or other server associated with the content item 211) when, for example, asynchronous content item tags (e.g. advertisement tags) are used for the web page 208. In some implementations, synchronous content item tags can be used and a time of load for the web page 208 can be determined and used as a proxy (e.g., an estimated measure) of the connection speed to be associated with a specific request of the user device 204.

In some implementations in which the connection speed is determined at the user device 204, the connection speed can be provided to the content server 202. The content server 202 can store the connection speed and other connection information in a connection information database 220. For example, as illustrated by example connection information 222, a determined connection speed, location information for the user device 204, and server information for the content server 202 and a server associated with the web page 208 are stored.

After the connection information 222 is stored in the connection information database 220, a second request for a content item (e.g., advertisement) can be received from the user device 204 for a content item to present in a content slot 224 on a web page 226. The content server 202 can use the connection information 224 to determine a content item to provide in response to the request. For example, the content server 204 can determine a content item type (e.g., image or text) or a content item size, based on the connection information. The content server 202 can identify a set of thresholds where each threshold corresponds to a particular connection speed and corresponds to a particular content item type. For example, thresholds of 1 MB/sec and 5 MB/sec can be identified, and the content server 202 can select a content item type of text if the connection speed is below the 1 MB/sec threshold, a content type of image if the connection speed is between the 1 MB/sec and 5 MB/sec thresholds, and a content type of rich media (e.g., video) if the connection speed is above the 5 MB/sec threshold.

For the example request received for the content slot 224, the content server 202 can identify a connection speed of 4 MB/sec in the connection information 224 and can determine an image content type should be selected based on the connection speed and on the 1 MB/sec and 5 MB/sec thresholds. Based on the determination, the content server 202 can select a content item that has an image content type. For example, the content server 202 can select a content item 228 from the content items repository 210. The selected content item 228 can be provided to and presented on the user device 204, as illustrated by a content item 230. In some implementations, a content item is initially selected based on, for example results of an auction, irrespective of connection speed. After selection, the content item can be adapted or an alternative content item that is associated with a same campaign can be selected dependent on the connection speed evaluation. In this example, selection is performed prior to consideration of connection speed. In this example, connection speed only influences the specific variation of a previously selected content item that is to be presented.

As another example, the user 205 may view a web page 232 (e.g., on a user (e.g., access) device 234) while in the Everglades National Park. The user device 234 can send a request for content for a content slot 236 that is included in the web page 232. The content server 202 can determine that the distance between the user device 234 and a nearest cell tower (e.g., the cell tower 219) is greater than a threshold number of miles (e.g., fifty), and therefore has a connection speed that is below a first threshold. In response to such a determination, the content server 202 can determine a content type of text for a content item to serve in response to the request for content. The content server 202 can select, for example, a text content item 238 from the content repository 210 and can provide the selected text content item 238 to the user device 234, as illustrated by a content item 240.

The content server 202 can periodically check a connection speed, such as a speed associated with a user's access to a web page such as the web page 208, a speed associated with a serving system such as the content server 202 or the content server 214, or a speed in effect during a session when the user device is at a particular location (e.g., Miami). The content server 202 can update the stored connection information based on the periodic checking. For example, the content server 202 can determine that a connection speed associated with requests served by the content server 214 has recently, on average, decreased from a previously stored connection speed and has recently been below a threshold. The content server 202 or the content server 214 can determine to select different types of content items for requests associated with the content server 204 based on the detected decreased connection speed. For example, a web page 242 presented on the user device 204 may be configured to request a content item from the content server 214. Based on the detected decreased connection speed associated with the content server 214, the content server 214 can select a text content item 244 and the selected text content item 244 can be provided to the user device 234 for presentation in the slot 224, as illustrated by a content item 246.

Figure 3A:
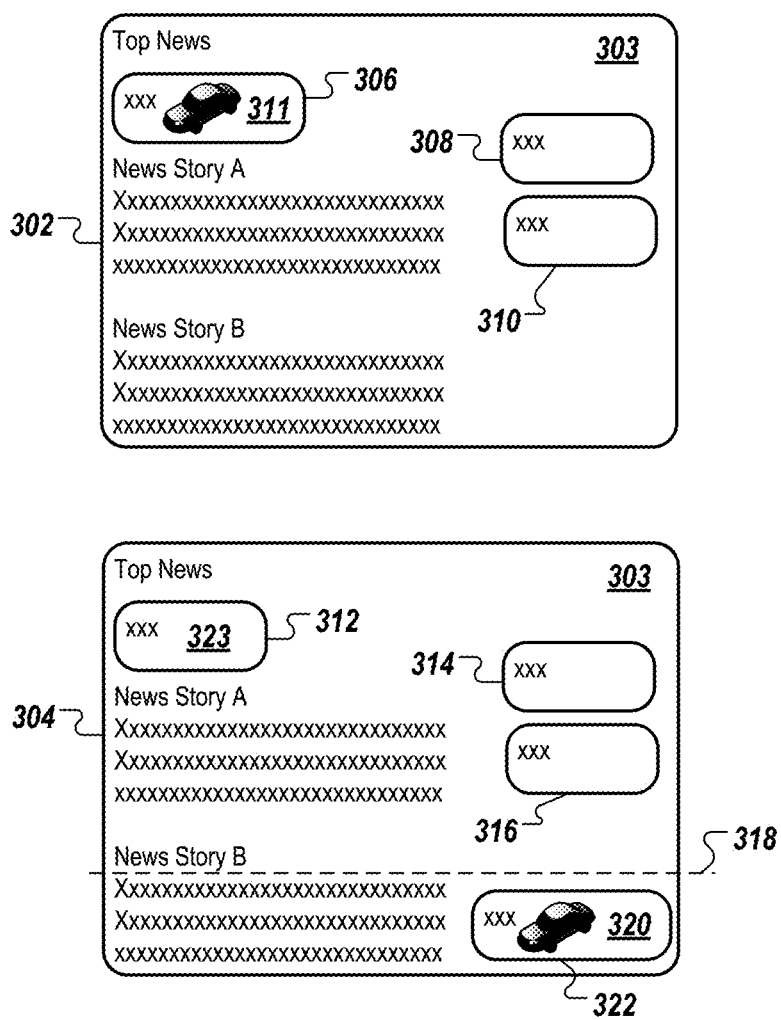
FIGS. 3A and 3B illustrate example web pages.

FIG. 3A illustrates example user interfaces 302 and 304. A web page 303 presented in the user interface 302 includes a top content slot 306 and side content slots 308 and 310. A publisher of the web page 303 can, for example, specify (e.g., using one or more publisher user interfaces) that an image content item is to be presented in the top content slot 306 and that text content items are to be presented in the side content slots 308 and 310. The publisher can specify that the top content slot 306 is for an image content item (e.g., an image content item 311) since, for example, the top content slot 306 may be considered a more prominent slot than the side content slots 308 and 310. In some implementations, the publisher can specify that an image content item is to be presented in the top content slot 306 when a determined connected speed is more than a threshold and that a text content item is to be presented in the top content slot 306 when the connection speed is less than the threshold. In some implementations, the web page 303 can be configured to load only a portion (e.g., a text only portion) of the content item 311 when a connection speed is below a threshold.

As another example, the publisher can specify that text content items are to be presented in content slots appearing near the top of the web page 303 so that a first portion of the web page 303 loads more quickly than if image content items were presented near the top of the web page 303 (which theoretically would be slower to load). For example, as illustrated in the user interface 304, text content items are presented in a top content slot 312 and side content slots 314 and 316, with the slots 312, 314, and 316 being above a fold line 318 (e.g., the slots 312, 314, and 316 are included in a first page view of the web page 303). In some implementations, the publisher can specify that image content items are to be presented in content slots that are below the fold line 318 (e.g., an image content item 320 presented in a content slot 322). For example, since the content slot 322 is below the fold line 318, the image content item 320 is not initially visible when the web page 303 first loads and therefore the image content item 320 has more time to load before being displayed (if the user does, in fact, page down) than, for example, a text content item 323 included in the top content slot 312.

Figure 3B:
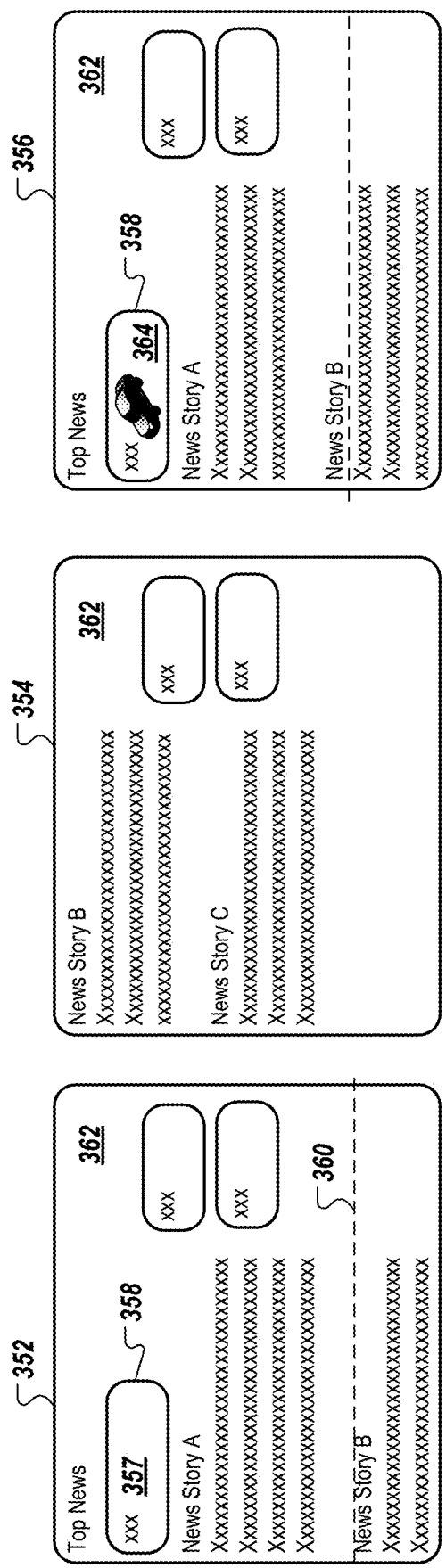

As another example, FIG. 3B illustrates example user interfaces 352, 354, and 356. In some implementations, for example, according to publisher specifications, a text content item 357 can be initially displayed in a content slot 358 that is included above a fold line 360 associated with a web page 362 presented in the user interface 352. If the user scrolls the web page 362 so that the content slot 358 is not visible (e.g., as illustrated in the user interface 354), the web page 362 can be configured to load an image content item in the content slot 358 (e.g., while the content slot 358 is not visible). If the user scrolls the web page 362 so that the content slot 358 is again visible (e.g., as illustrated in the user interface 356), the image content item can be presented in the content slot 358 (e.g., as illustrated by an image content item 364).

Figure 4:
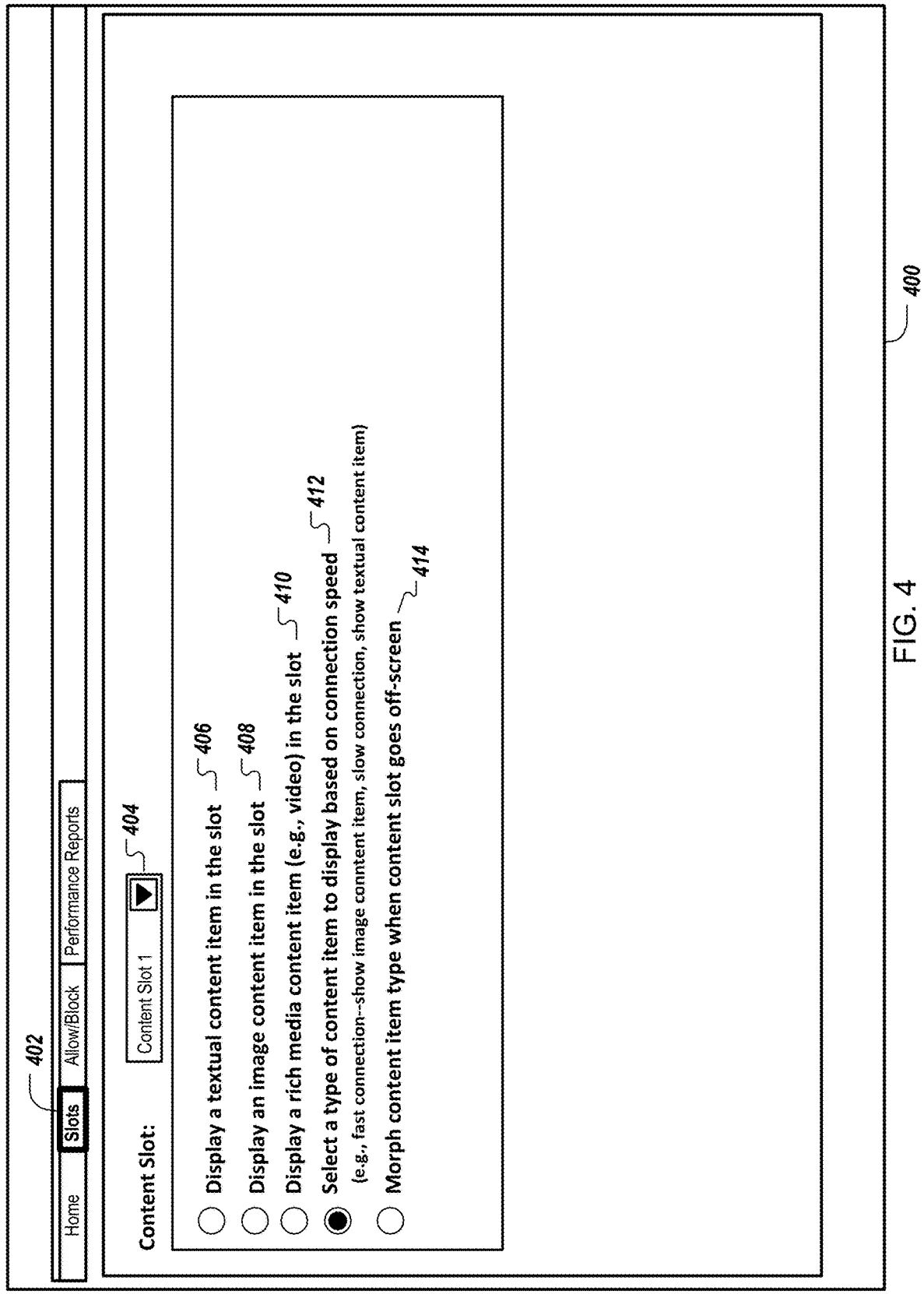
FIG. 4 illustrates an example publisher user interface.

FIG. 4 illustrates an example publisher user interface 400. A publisher can select a control (e.g., tab 402) to configure content slots on a resource associated with the publisher. The publisher can select a content slot (e.g., content slot one) using a control 404 to configure the display of content items within the selected content slot. For example, controls 406, 408, and 410 can be selected to specify that a textual, image, or rich media content item are to be displayed in the selected content slot, respectively. As another example, a control 412 can be selected to specify that a type of content item to display in the content slot can be based on connection speed (e.g., with a fast connection, an image content item can be displayed, and with a slow connection, a textual content item can be displayed).

As yet another example, a control 414 can be selected to specify that a content item type of the content item displayed in the content slot can "morph" (e.g., change) when the content slot goes off-screen. For example, the content slot can be above the fold and a textual content item can be initially displayed in the content slot. When the user scrolls down so that the content slot is off-screen, an image content item can be loaded into the content slot and presented when the user scrolls the content slot back into view.

Figure 5:
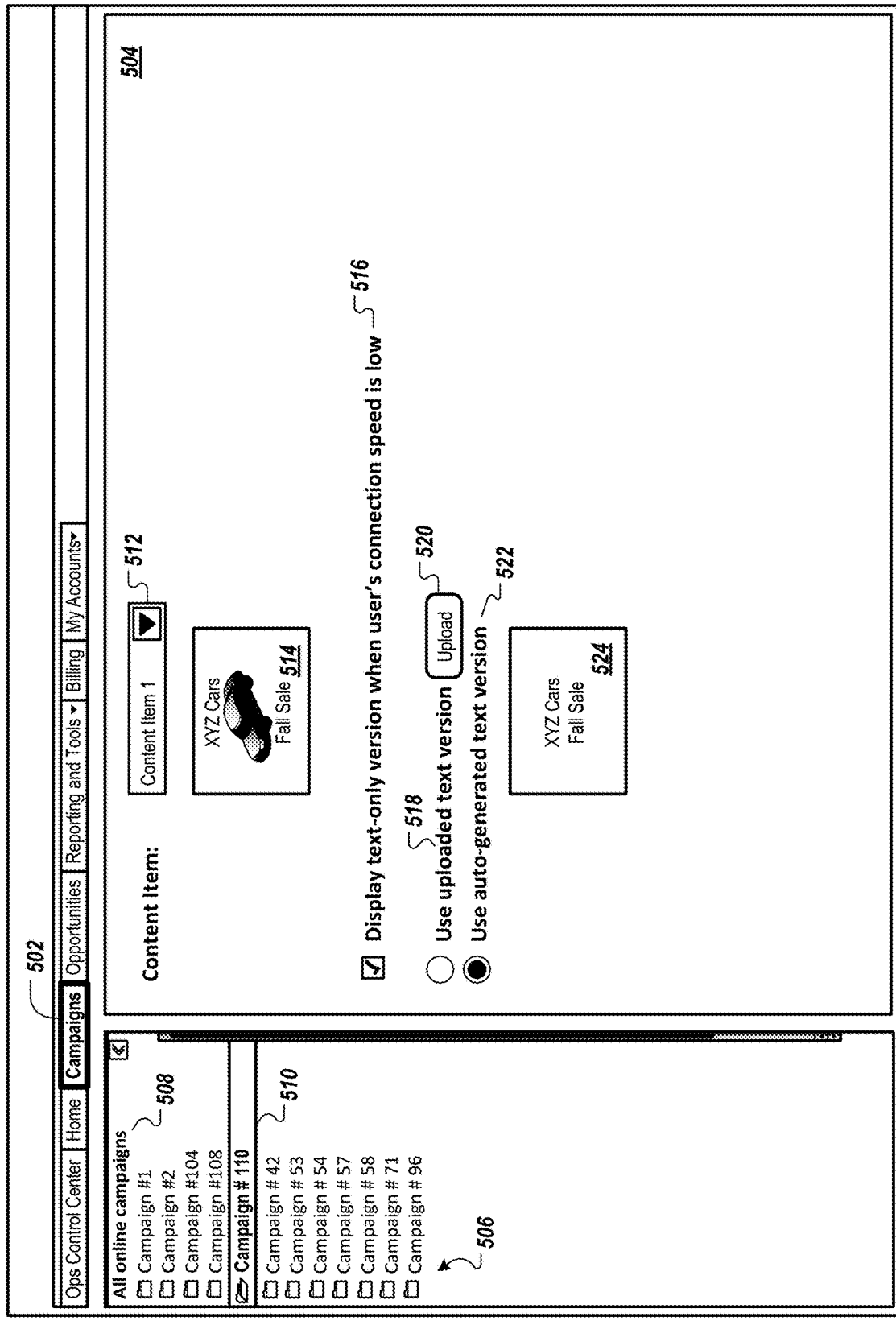
FIG. 5 illustrates an example campaign management user interface.

FIG. 5 illustrates an example campaign management user interface 500. The user interface 500 can be included, for example, in one or more user interfaces that a user, such as a content sponsor, can use to configure a campaign. The content sponsor can select a control (e.g., tab 502) to display a campaign configuration area 504. The content sponsor can view a list 506 of campaigns by selecting a control 508. The content sponsor can edit an existing campaign in the campaign configuration area 504 by selecting the name of an existing campaign (e.g., a name 510) in the campaign list 506 or alternatively can create a new campaign. The content sponsor can select a content item for the campaign using a control 512.

A selected content item 514 is displayed. The selected content item 514 includes image content. The content sponsor can select a control 516 to specify that a text-only version of the selected content item 514 is to be displayed to a user when the user's connection speed is below a threshold. The content sponsor can select a control 518 to indicate that an uploaded text version is to be displayed when the user's connection speed is below the threshold. The content sponsor can upload a text version of the selected content item 514 by selecting an upload control 520. The content sponsor can select a control 522 to specify that an auto-generated text version of the selected content item is to be displayed when the user's connection speed is below the threshold. In response to selection of the control 522, a text-only version of the selected content item 514 can be generated and presented in the campaign configuration area 504 (e.g., as illustrated by a text-only content item 524).

Figure 6:
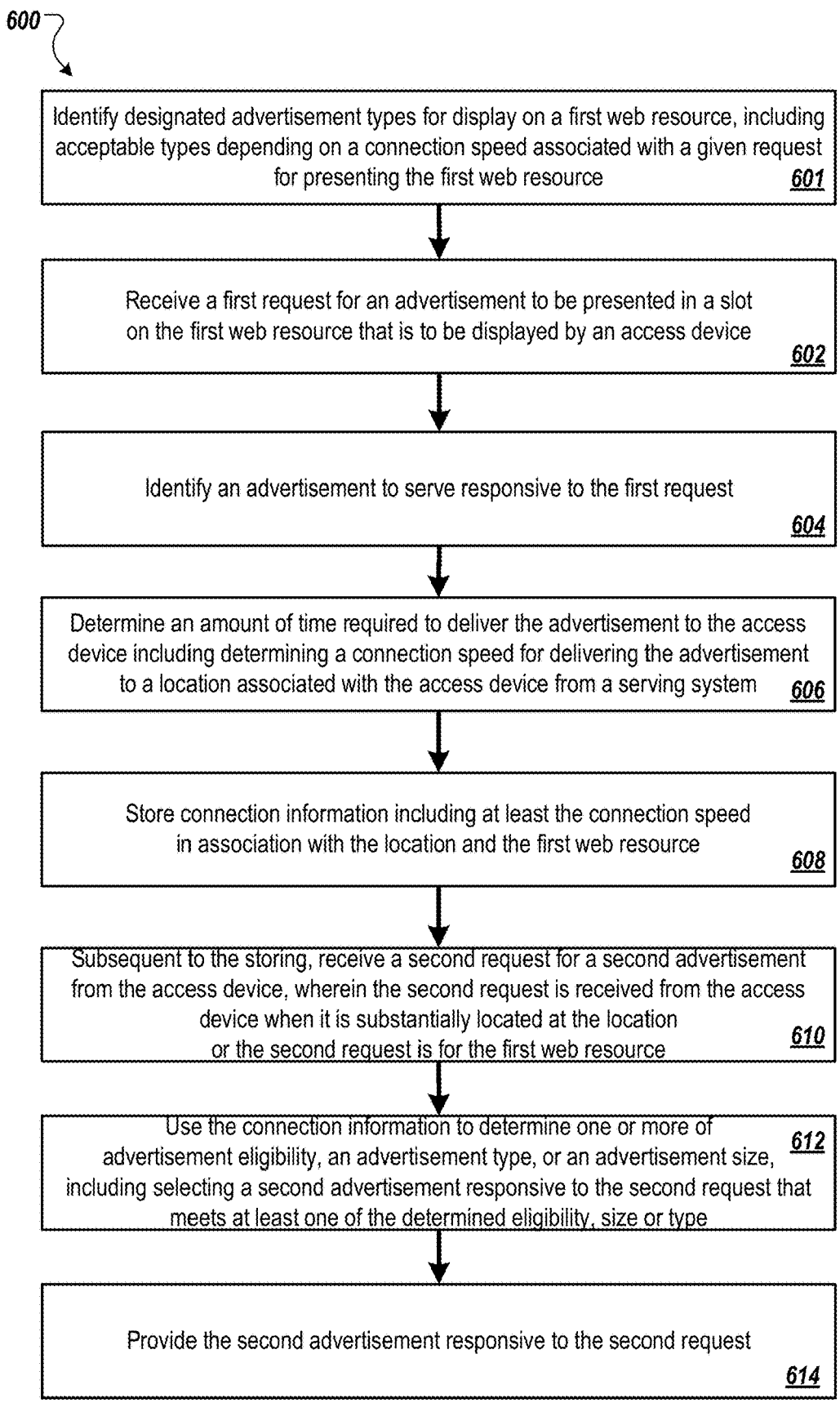
FIG. 6 is a flowchart of an example process for providing content.

FIG. 6 is a flowchart of an example process 600 for providing content. The process 600 can be performed, for example, by the content management system 110 described above with respect to FIG. 1 or the content server 202 described above with respect to FIG. 2. The description below refers to selection and provision of advertisements, but content items other than advertisements can be selected and provided.

Designated advertisement types are identified for display on a first web resource (601), including acceptable types depending on a connection speed associated with a given request for presenting the first web resource. Advertisement types can include, for example, text, image, and rich media (e.g., video). The first web resource can be, for example, a web page. The first web resource can be associated with a network address (e.g., an IP address of a server that serves the first web resource).

A first request for an advertisement is received (602), wherein the advertisement is to be presented in a slot on the first web resource that is to be displayed by an access device. In some implementations, requests for content items other than advertisements are received.

An advertisement to serve responsive to the first request is identified (604). The advertisement or another type of content item can be identified based on the identified advertisement or content item having characteristics matching the characteristics of the slot. As another example, an advertisement or a content item can be identified that has selection criteria (e.g., keywords) that match resource keywords associated with the web resource.

An amount of time required to deliver the advertisement to the access device is determined (606), including determining a connection speed for delivering the advertisement to a location associated with the access device from a serving system. Determining the connection speed can include, for example, determining an amount of time elapsed between an associated advertisement call for the first request and the identified advertisement loading on the access device. The connection speed can be determined, for example, by dividing a file size of the identified advertisement by the elapsed time. As another example, the amount of time required to deliver the advertisement to the access device can be estimated based on determining a distance between the serving system and the access device and/or based on a distance between a second serving system associated with the web resource and the access device. In some implementations, determining the connection speed includes determining a load speed of content from the first web resource as a proxy for the connection speed for loading the advertisement from the serving system.

Connection information including at least the connection speed is stored in association with the location and the first web resource (608). In some implementations, connection information can include an identifier associated with the access device, the determined connection speed, location information associated with the access device, an identifier (e.g., an IP (Internet Protocol) address) associated with the serving system, an identifier (e.g., an IP address) associated with the web resource, or other connection-related information.

Subsequent to the storing, a second request for a second advertisement is received from the access device (610), wherein the second request is received from the access device when it is substantially located at the location or the request is for the first web resource.

The connection information is used to determine one or more of advertisement eligibility, an advertisement type, or an advertisement size (612), including selecting a second advertisement responsive to the second request that meets one or more of the determined eligibility, size or type. For example, one or more predetermined thresholds can be identified for determining which types of advertisements are eligible to compete for which connection speeds. For example, a text-or-image threshold speed and an image-or-rich-media threshold speed can be identified. A connection speed associated with the second request can be determined based at least in part on the stored connection information. When the connection speed is less than the text-or-image threshold speed, a text advertisement can be selected. When the connection speed is greater than the text-or-image threshold speed and less than the image-or-rich-media threshold speed, an image advertisement can be selected. When the connection speed is greater than the image-or-rich-media threshold speed, a rich media (e.g., video) advertisement can be selected.

The second advertisement is provided responsive to the second request (614). For example, a text advertisement, an image advertisement, or a rich media advertisement can be provided to the access device. In some implementations and for some second requests, an updated connection speed is determined and updated connection information is stored, to be used for requests received subsequent to the second request.

Figure 7:
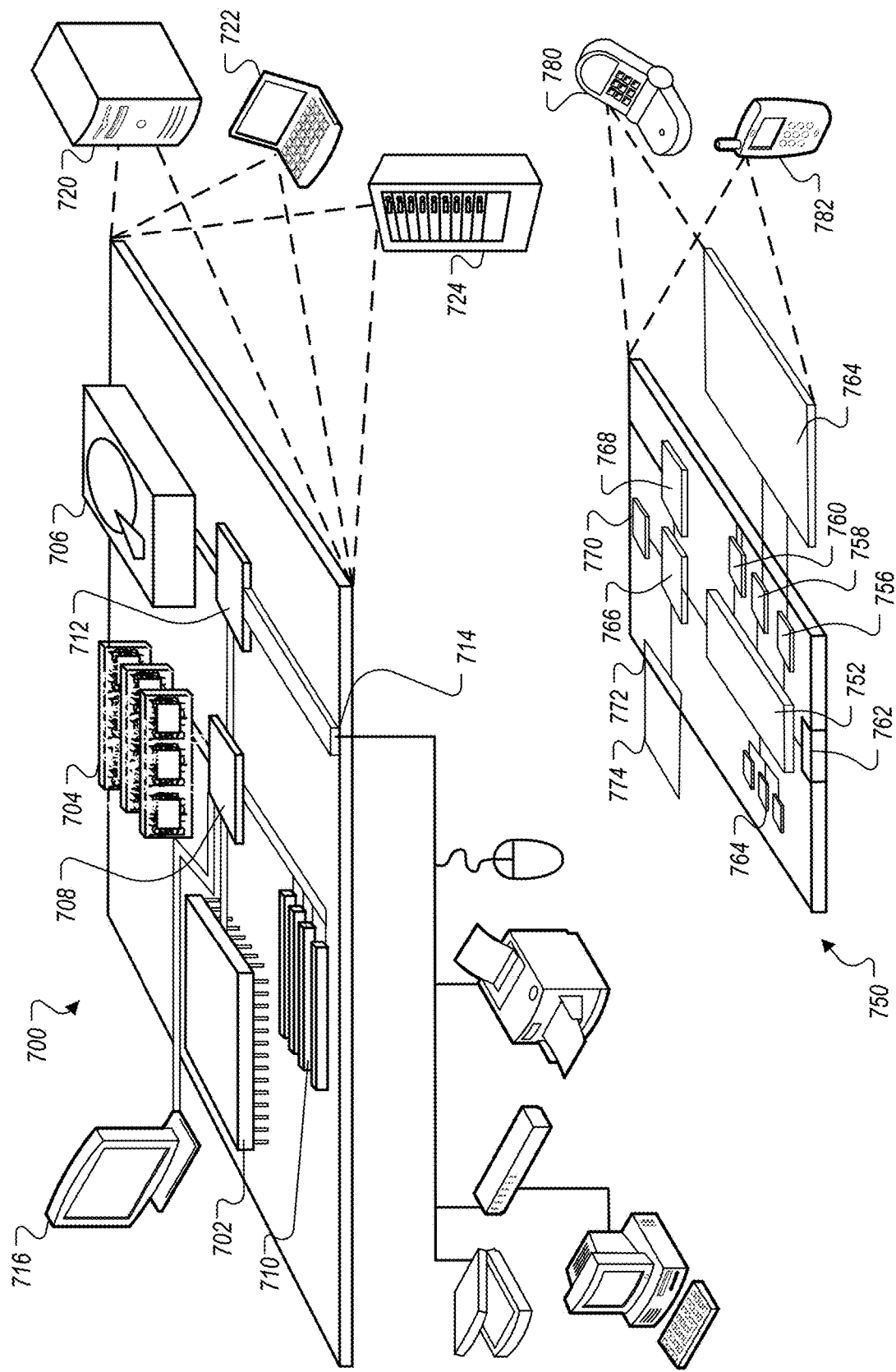
FIG. 7 is a block diagram of computing devices that may be used to implement the systems and methods described in this document, as either a client or as a server or plurality of servers.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be illustrative only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a computer-readable medium. The computer-readable medium is not a propagating signal. In one implementation, the memory 704 is a volatile memory unit or units. In another implementation, the memory 704 is a non-volatile memory unit or units.

The storage device 706 is capable of providing mass storage for the computing device 700. In one implementation, the storage device 706 is a computer-readable medium. In various different implementations, the storage device 706 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of duties is illustrative only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can process instructions for execution within the computing device 750, including instructions stored in the memory 764. The processor may also include separate analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD display or an OLED display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication (e.g., via a docking procedure) or for wireless communication (e.g., via Bluetooth® or other such technologies).

The memory 764 stores information within the computing device 750. In one implementation, the memory 764 is a computer-readable medium. In one implementation, the memory 764 is a volatile memory unit or units. In another implementation, the memory 764 is a non-volatile memory unit or units. Expansion memory 774 may also be provided and connected to device 750 through expansion interface 772, which may include, for example, a SIMM card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth®, WiFi, or other such transceiver (not shown). In addition, GPS receiver module 770 may provide additional wireless data to device 750, which may be used as appropriate by applications running on device 750.

Device 750 may also communicate audibly using audio codec 760, which may receive spoken information from a user and convert it to usable digital information. Audio codex 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A computer implemented method comprising:
identifying acceptable content types for display on an Internet-connected device depending on a connection speed of a connection to the Internet-connected device;
receiving a first request for a content item to be presented by the Internet connected device;
identifying a content item to serve responsive to the first request;
determining an amount of time required to deliver the content item to the Internet connected device;
calculating a connection speed for delivering the content item to a location of the Internet connected device from a serving system based on the determined amount of time and a file size of the content item;
storing the connection speed in association with the location and the Internet-connected device;
subsequent to the storing, receiving one or more additional requests for content items from one or more Internet-connected devices that are located at the location;
receiving information about a current network condition that has an effect on the connection speed of the one or more Internet-connected devices when at the location;
determining an estimate of the effect that the current network condition has on the connection speed;
reducing the calculated connection speed based on the effect that the current network condition has on a speed of a network connection to the Internet-connected device;
using the reduced connection speed to determine one or more of a content item eligibility, a content item type, or a content item size, including selecting a different content item responsive to at least one of the one or more additional requests that meets at least one of the determined eligibility, size or type; and
providing the different content item responsive to the at least one of the additional requests.

2. The method of claim 1, wherein determining the amount of time includes determining the time elapsed between a content item call for the first request and the identified content item loading on the Internet-connected device, wherein the time elapsed is based on a file size of the identified content item and a connection speed associated with a connection between the Internet-connected device and the serving device.

3. The method of claim 1, further comprising identifying one or more predetermined thresholds for determining which types of content are eligible to compete for which connection speeds, and determining a connection speed associated with the second request based at least in part on the stored connection information, wherein using the connection information further includes determining whether to show text content items, image content items or rich media content items and wherein providing the second content item includes providing an appropriate content item in accordance with the determining.

4. The method of claim 1, further comprising periodically checking a connection speed associated with the Internet-connected device's access to a serving system and updating the connection information based on the periodic checking.

5. The method of claim 1, further comprising:
receiving a second request for a content item to be presented by the Internet-connected device,
identifying a second connection speed for delivering content responsive to the second request;
determining that the second connection speed is different than the connection speed for delivering the content item responsive to the first request;
using the second connection speed to determine one or more of content item eligibility, content item type, or content item size, including selecting a third content item responsive to the second request that meets at least one of the determined eligibility, size or type and is of a different size or type than the second content item, and
providing the second content item responsive to the second received request.

6. The method of claim 1, wherein the content items comprise advertisement.

7. The method of claim 1, further comprising determining whether the different content item is going to be visible on a display of the access device at a time of the initial load or whether the different content item will be below or above a fold line associated with the display, and wherein selecting the different content item is based at least in part on whether the different content item is visible at the time of the initial load.

8. The method of claim 1, further comprising loading only a portion of the different content item initially when the connection speed is below a first threshold.

9. The method of claim 8, wherein the portion is a text only portion.

10. The method of claim 1, further comprising:
providing a user interface accessible by an entity associated with a publisher of the first content item;
providing in the interface a control for designating content types for display on the Internet-connected device including an option to limit the types depending on the connection speed; and
receiving a selection of content types and option information that embodies a selection of the option;
wherein determining the different content item is based at least in part on the selection of content types and the option information received from the entity.

11. The method of claim 1, wherein the connection information is used to select content items delivered to the Internet-connected device for one session without further update of the speed information during the one session.

12. The method of claim 1, wherein determining the connection speed further includes determining a load speed of content from the Internet-connected device as a proxy for the connection speed for loading the content item from the serving system.

13. A system comprising:
one or more processors; and
one or more memory elements including instructions that when executed cause the one or more processors to:
identifying acceptable content types for display on an Internet-connected device depending on a connection speed of a connection to the Internet-connected device;
receiving a first request for a content item to be presented by the Internet connected device;
identifying a content item to serve responsive to the first request;
determining an amount of time required to deliver the content item to the Internet connected device;
calculating a connection speed for delivering the content item to a location of the Internet connected device from a serving system based on the determined amount of time and a file size of the content item;
storing the connection speed in association with the location and the Internet-connected device;
subsequent to the storing, receiving one or more additional requests for content items from one or more Internet-connected devices that are located at the location;
receiving information about a current network condition that has an effect on the connection speed of the one or more Internet-connected devices when at the location;
determining an estimate of the effect that the current network condition has on the connection speed;
reducing the calculated connection speed based on the effect that the current network condition has on a speed of a network connection to the Internet-connected device;
using the reduced connection speed to determine one or more of a content item eligibility, a content item type, or a content item size, including selecting a different content item responsive to at least one of the one or more additional requests that meets at least one of the determined eligibility, size or type; and
providing the different content item responsive to the at least one of the additional requests.

14. The system of claim 13, wherein determining the amount of time includes determining the time elapsed between a content item call for the first request and the identified content item loading on the Internet-connected device, wherein the time elapsed is based on a file size of the identified content item and a connection speed associated with a connection between the Internet-connected device and the serving device.

15. The system of claim 13, the instructions further comprising instructions that when executed cause the one or more processors to one or more predetermined thresholds for determining which types of content are eligible to compete for which connection speeds, and determining a connection speed associated with the second request based at least in part on the stored connection information, wherein using the connection information further includes determining whether to show text content items, image content items or rich media content items and wherein providing the second content item includes providing an appropriate content item in accordance with the determining.

16. The system of claim 13, the instructions further comprising instructions that when executed cause the one or more processors to periodically check a connection speed associated with the Internet-connected device's access to a serving system and updating the connection information based on the periodic checking.

17. A computer program product tangibly embodied in a non-transitory computer-readable storage device and comprising instructions that, when executed by a processor, cause the processor to:
identify acceptable content types for display on an Internet-connected device depending on a connection speed of a connection to the Internet-connected device;
receive a first request for a content item to be presented by the Internet connected device;
identify a content item to serve responsive to the first request;
determine an amount of time required to deliver the content item to the Internet connected device;
calculate a connection speed for delivering the content item to a location of the Internet connected device from a serving system based on the determined amount of time and a file size of the content item;
store the connection speed in association with the location and the Internet-connected device;
subsequent to the storing, receive one or more additional requests for content items from one or more Internet-connected devices that are located at the location;
receive information about a current network condition that has an effect on the connection speed of the one or more Internet-connected devices when at the location;
determine an estimate of the effect that the current network condition has on the connection speed;
reduce the calculated connection speed based on the effect that the current network condition has on a speed of a network connection to the Internet-connected device;
use the reduced connection speed to determine one or more of a content item eligibility, a content item type, or a content item size, including selecting a different content item responsive to at least one of the one or more additional requests that meets at least one of the determined eligibility, size or type; and
provide the different content item responsive to the at least one of the additional requests.

18. The product of claim 17, wherein determining the amount of time includes determining the time elapsed between a content item call for the first request and the identified content item loading on the Internet-connected device, wherein the time elapsed is based on a file size of the identified content item and a connection speed associated with a connection between the Internet-connected device and the serving device.

19. The product of claim 17, the instructions further comprising instructions that when executed cause the processor to periodically check a connection speed associated with the Internet-connected device's access to a serving system and updating the connection information based on the periodic checking.

20. The product of claim 17, the instructions further comprising instructions that when executed cause the processor to identify one or more predetermined thresholds for determining which types of content are eligible to compete for which connection speeds, and determine a connection speed associated with the second request based at least in part on the stored connection information, wherein using the connection information further includes determining whether to show text content items, image content items or rich media content items and wherein providing the second content item includes providing an appropriate content item in accordance with the determining.

\* \* \* \* \*